Feb. 20, 1934.  R. P. LAMONT, JR  1,948,269
DEVICE FOR PREVENTING DISTORTION OF BEEF CARCASSES
Filed Jan. 5, 1933
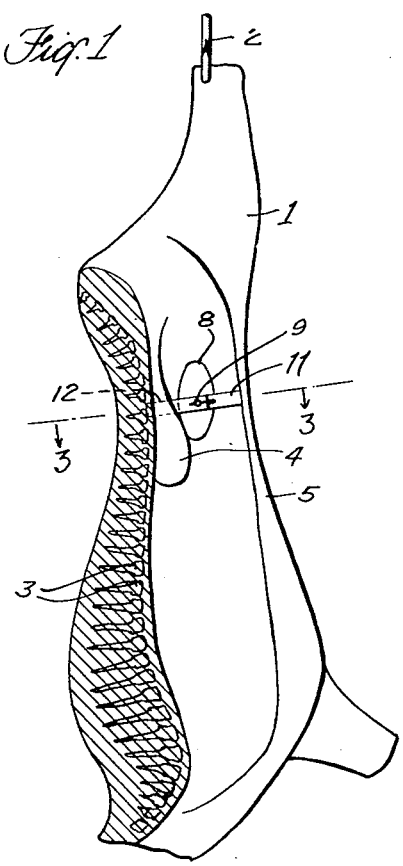
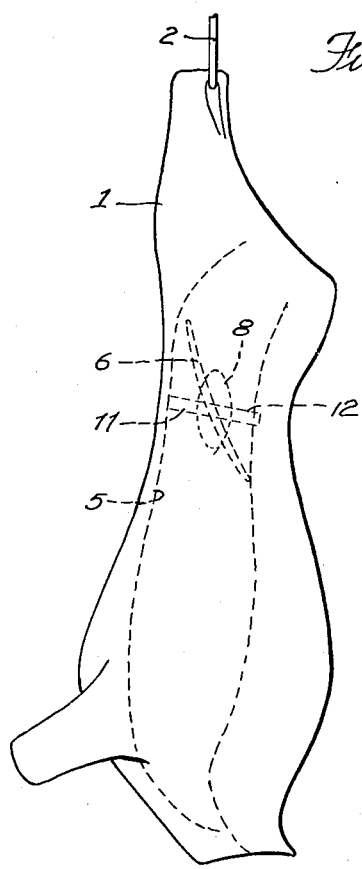
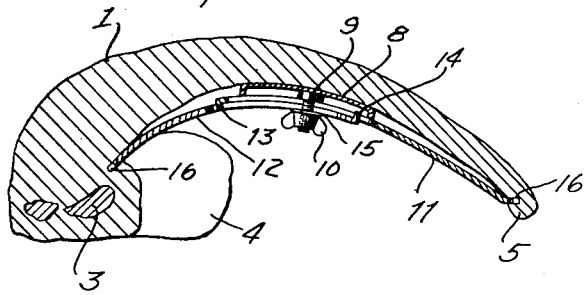
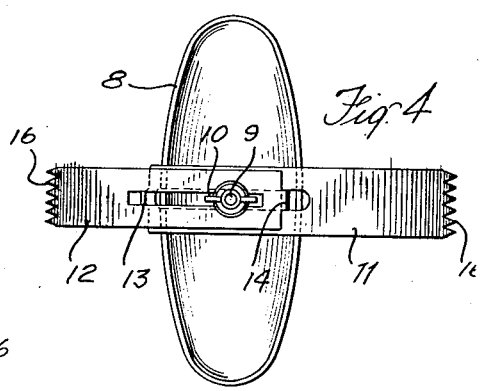
INVENTOR
ROBERT P. LAMONT JR.
BY
Newell & Spencer
ATTORNEYS Patented Feb. 20, 1934

1,948,269

UNITED STATES PATENT OFFICE 1,948,269

DEVICE FOR PREVENTING DISTORTION OF BEEF CARCASSES

Robert P. Lamont, Jr., Larkspur, Colo.

Application January 5, 1933. Serial No. 650,234

5 Claims. (Cl. 17—44)

This invention relates to a device for preventing certain distortions which have a tendency to develop on the outside of a beef carcass after it has been hung up in the usual manner in a slaughter house or refrigerating plant. It is found that when a carcass is so hung, the distortion of the muscles causes a deep crease to appear along the outside, which crease detracts from the appearance of the carcass, may spoil one or more steaks, and gives an opportunity for the collection of mould if the beef is hung for any length of time.

The present invention seeks to overcome this difficulty by introducing a resistance to the distortion along a path between the backbone and the flank, approximately in the region of the kidney.

Fig. 1 is an elevation of the interior of a beef carcass showing the general position of the carcass when hung by the tendon of the hind leg, having my invention applied thereto;

Fig. 2 is a view similar to Fig. 1, but showing the outside of such a carcass;

Fig. 3 is a sectional view taken along the line 3—3 of Fig. 1; and

Fig. 4 is a top plan view of a preferred form of the device whereby the invention is carried out.

Referring to the drawing in detail, 1 indicates a beef carcass which is hung by a hook 2 through the tendon of the hind leg. 3 indicates the backbone, 4 the kidney, and 5 the flank. The distortion to which reference has been made occurs along the outside of the carcass as indicated in Fig. 2 by the dotted area 6. To prevent the formation of this crease, I introduce a resistance to the distortion along a path between the backbone and the flank, and preferably in the region of the kidney, and the particular means which I employ for this purpose comprises a device having a base 8 of somewhat oval shape, as indicated in Fig. 4, and somewhat curved in cross section, as indicated in Fig. 3. At about the center of this base member 8 is secured a stud 9 having a screw-threaded outer portion adapted to receive a wing nut 10. Two curved resilient members 11 and 12 are supported for pivotal movement on the stud 9. Each member is provided with a central longitudinally-extending slot which is of sufficient width to engage over the stud 9, and of a length to permit a sufficient degree of sliding movement of the members to adapt the device to be used with carcasses of different sizes. In order to limit the movement of the members 11 and 12, they are provided with lugs 13 and 14 respectively, and a washer 15 is interposed between the wing nut 10 and the resilient members. These members are preferably leaf springs and their ends are provided with saw-like teeth indicated at 16.

The base member 8 is curved in cross section and the members 11 and 12 are likewise curved so that when the device is applied to a carcass in the manner shown in Figs. 1 and 3, with the ends of the members engaging the interior of the carcass at locations near the backbone and flank respectively, said base member and the members 11 and 12, by reason of their shape, will engage the interior of the carcass and resist any tendency to distortion of the carcass in the zone which is thus subjected to the controlling action of the device. The base 8 and members 11 and 12 may be said to have a shape to conform generally to the normal contour of the carcass along the path where the device is preferably to be located, and any tendency of the carcass to distort sets up a strain which is resisted by the springiness of the members 11 and 12 and tends to create a pressure on the interior of the carcass to hold it to its normal contour. It is preferable that the device be made of a stainless metal.

It is to be noted that the member 11 is somewhat longer than the member 12, and is of slightly different shape in order to conform to the interior contour of the carcass adjacent to which this member is placed. By reason of the pivotal action of the members, they may be turned completely around so as to be applicable to either a right side of beef or a left side.

What is claimed as new is:

1. A device for preventing distortion of a beef carcass comprising a base, oppositely extending members pivoted to the base, the ends of said members adapted to abut the carcass at locations near the backbone and flank respectively, said base and members having a shape to conform to the normal interior contour of the carcass.

2. A device for preventing distortion of a beef carcass comprising a base, oppositely extending flexible members pivoted to the base, the ends of said members adapted to abut the carcass at locations near the backbone and flank respectively, said base and members having a shape to conform to the normal interior contour of the carcass.

3. A device for preventing distortion of a beef carcass comprising a base and members extending therefrom, the ends of said members adapted to abut the carcass at locations near the backbone and flank respectively, and when so placed, to engage the interior of the carcass along a path between the backbone and flank in the region of the kidney, said base and members having a shape to conform to the normal interior contour of the carcass along said path.

4. A device for preventing distortion of a beef carcass comprising a base, oppositely extending slotted members adjustably pivoted to the base, the ends of such members adapted to abut the carcass at locations near the backbone and flank respectively, said base and members having a shape to conform to the normal interior contour of the carcass.

5. A device for preventing distortion of a beef carcass comprising a base, oppositely extending slotted members adjustably pivoted to the base, one of said members being longer than the other, the ends of such members adapted to abut the carcass at locations near the backbone and flank respectively, said base and members having a shape to conform to the normal interior contour of the carcass.

ROBERT P. LAMONT, Jr.